United States Patent
Yamamoto et al.

(10) Patent No.: US 7,223,831 B2
(45) Date of Patent: May 29, 2007

(54) BIODEGRADABLE RESIN COMPOSITION

(75) Inventors: Minoru Yamamoto, Tokushima (JP); Ryoichi Hiroi, Tokushima (JP)

(73) Assignee: Otsuka Chemical Co., Ltd., Osaka (JP)

( * ) Notice: Subject to any disclaimer, the term of this patent is extended or adjusted under 35 U.S.C. 154(b) by 0 days.

(21) Appl. No.: 10/972,756

(22) Filed: Oct. 26, 2004

(65) Prior Publication Data

US 2006/0089420 A1    Apr. 27, 2006

(51) Int. Cl.
*C08G 63/06* (2006.01)
*C08G 63/08* (2006.01)
*C08F 283/00* (2006.01)

(52) U.S. Cl. ............... 528/361; 528/354; 528/271; 528/486; 525/415; 525/419; 525/420; 525/450

(58) Field of Classification Search ........... 528/361, 528/271, 486, 354; 525/415, 419, 420, 450
See application file for complete search history.

(56) References Cited

FOREIGN PATENT DOCUMENTS

| JP | 2003-73538 A | 3/2003 |
| JP | 2003-82212 A | 3/2003 |
| WO | 88/00090 | * 1/1988 |

* cited by examiner

*Primary Examiner*—Duc Truong
(74) *Attorney, Agent, or Firm*—Kubovcik & Kubovcik

(57) ABSTRACT

A biodegradable resin composition comprising polylactic acid and nanosheeted layered titanic acid characterized in that the nonasheeted layered titanic acid is nanosheeted layered titanic acid obtained by a preparing process comprising the steps of:

(1) treating layered titanate represented by the general formula:

$$A_x M_y \square_z Ti_{2-(y+z)} O_4 \qquad (1)$$

[wherein A and M represent a different monovalent to trivalent metal, $\square$ represents a part defective in Ti, x is a positive real number satisfying $0<x<1.0$, and y and z are 0 or a positive real number satisfying $0<y+z<1.0$, respectively]

with an acid or warm water to replace an A ion and/or a M ion with hydrogen and/or a hydronium ion, and (2) reacting the resulting compound with a basic compound having interlayer swelling activity thereon, to swell or peel between layers.

8 Claims, No Drawings

BIODEGRADABLE RESIN COMPOSITION

BACKGROUND OF THE INVENTION

1. Field of the Invention

The present invention relates to a biodegradable resin composition comprising polylactic acid and nanosheeted layered titanic acid, which is excellent in mechanical strength, moldability, dimensional stability and durability.

2. Description of the Related Art

In recent years, a biodegradable resin as an environment harmonizing-type polymer has been intensively studied. In particular, much attention is paid to polylactic acid as a raw material of plant which enables carbon neutral not only from a viewpoint of biodegradability but also from the cost and high physical property. However, a molded product therefrom has a problem that heat resistance, rigidity and impact resistance are inferior, thus, not leading to full-scale development. For solving such the drawbacks, techniques regarding a composition in which a layered silicate-based nanosheet treated with a swelling agent such as an ammonium salt and a phosphonium salt is uniformly dispersed in polylactic acid, and a film and a functional material obtained therefrom are disclosed, and it is shown that excellent heat resistance and rigidity, and gas barrier property are obtained while suppressing a specific gravity, by complexing polylactic acid and layered silicate (see, for example, JP-A No. 2003-82212 and JP-A No. 2003-73538).

However, in such the method, as a layered silicate-based nanosheet is dispersed better in polylactic acid, reduction in a molecular weight occurs at kneading, and a melt viscosity is reduced. Since reduction in a melt viscosity deteriorates molding processibility of, for example, a film, and further increases a thermal expansion coefficient under a high temperature, dimensional stability is deteriorated.

SUMMARY OF THE INVENTION

An object of the present invention is to provide a biodegradable resin composition comprising polylactic acid and nanosheeted layered titanic acid, which is excellent in mechanical strength, moldability, dimensional stability and durability.

The present inventors studied intensively and, as a result, found that a biodegradable resin composition comprising polylactic acid and nanosheeted layered titanic acid is excellent in mechanical strength, moldability, dimensional stability and durability, which resulted in completion of the present invention.

That is, the present invention relates to the following 1 to 7 biodegradable resin composition, nanosheeted layered titanic acid and process for preparing the same.

1. A biodegradable resin composition comprising polylactic acid and nanosheeted layered titanic acid.

2. A biodegradable resin composition comprising 100 parts by weight of polylactic acid and 0.5 to 100 parts by weight of nanosheeted layered titanic acid.

3. The biodegradable resin composition according to 1 or 2, wherein the nanosheeted layered titanic acid is nanosheeted layered titanic acid obtained by a preparing process comprising:

(1) a step of treating nanosheeted layered titanate represented by the general formula:

$$A_xM_y\square_zTi_{2-(y+z)}O_4 \quad (1)$$

[wherein A and M represent a different monovalent to trivalent metal, $\square$ represents a part defective in Ti, x is a positive real number satisfying $0<x<1.0$, and y and z are 0 or a positive real number satisfying $0<y+z<1.0$, respectively]

with an acid or warm water to replace an A ion and/or a M ion with hydrogen and/or a hydronium ion, and (2) a step of acting a basic compound having interlayer swelling activity thereon, to swell or peel between layers.

4. The biodegradable resin composition according to the above 1 or 2, wherein the nanosheeted layered titanic acid is nanosheeted layered titanic acid obtained by a preparing process of performing, in one pot, (1) a step of treating nanosheeted layered titanate represented by the general formula:

$$A_xM_y\square_zTi_{2-(y+z)}O_4 \quad (1)$$

[wherein A and M represent a different monovalent to trivalent metal, $\square$ represents a part defective in Ti, x is a positive real number satisfying $0<x<1.0$, and y and z are 0 or a positive real number satisfying $0<y+z<1.0$, respectively]

with an acid or warm water to replace an A ion and/or a M ion with hydrogen and/or a hydronium ion, and (2) a step of acting a basic compound having interlayer swelling activity thereon, to swell or peel between layers.

5. The biodegradable resin composition according to any one of the above 1 to 4, wherein the nanosheeted layered titanic acid is nanosheeted layered titanic acid represented by the general formula:

$$B_mC_n\square_{(y+z)}Ti_{2-(y+z)}O_4 \quad (2)$$

[wherein B represents a basic compound having interlayer swelling activity, C represents hydrogen and/or a hydronium ion, $\square$ represents a part defective in Ti, m is a positive real number satisfying $0.1<m<0.7$, n is a positive real number satisfying $0.3<n<0.9$, more preferably, n is a positive real number satisfying $0.5<n<0.8$, a sum of m and n corresponds to x in the general formula (1), and y and z are 0 or a positive real number satisfying $0<y+z<1.0$, respectively].

6. Nanosheeted layered titanic acid represented by the general formula:

$$B_mC_n\square_{(y+z)}Ti_{2-(y+z)}O_4 \quad (2)$$

[wherein B represents a basic compound having interlayer swelling activity, C represents hydrogen and/or a hydronium ion, $\square$ represents a part defective in Ti, m is a positive real number satisfying $0.1<m<0.7$, n is a positive real number satisfying $0.3<n<0.9$, more preferably, n is a positive real number satisfying $0.5<n<0.8$, a sum of m and n corresponds to x in the general formula (1), and y and z are 0 or a positive real number satisfying $0<y+z<1.0$, respectively].

7. A process for preparing nanosheeted layered titanic acid obtained by a preparing process, which comprises performing, in one pot, (1) a step of treating layered titanate represented by the general formula:

$$A_xM_yO_zTi_{2-(y+z)}O_4 \quad (1)$$

[wherein A and M represent a different monovalent to trivalent metal, $\square$ represents a part defective in Ti, x is a positive real number satisfying $0<x<1.0$, and y and z are 0 or a positive real number satisfying $0<y+z<1.0$, respectively]

with an acid or warm water to replace an A ion and/or a M ion with hydrogen and/or a hydronium ion, and (2) a step of acting a basic compound having interlayer swelling activity thereon, to swell or peel between layers.

According to the present invention, organized layered titanic acid can be uniformly dispersed in polylactic acid to obtain a biodegradable resin composition having better mechanical strength, moldability, dimensional stability and durability.

DESCRIPTION OF PREFERRED EMBODIMENTS

The present invention is a biodegradable resin composition comprising polylactic acid and nanosheeted layered titanic acid.

As polylactic acid used in the present invention, poly(L-lactic acid), poly(D-lactic acid), and a mixture or a copolymer of them can be used. In addition, a process for preparing polylactic acid is not particularly limited, but the known process can be used. For example, there can be exemplified direct polymerization of L-lactic acid or D-lactic acid, and ring opening polymerization of L-lactide, D-lactide, or meso-lactide which is a cyclic dimer of lactic acid.

The nanosheeted layered titanic acid used in the present invention is layered titanic acid obtained by a preparing process, which comprises:

(1) a step of treating layered titanate represented by the general formula:

$$A_xM_y\square_zTi_{2-(y+z)}O_4 \quad (1)$$

[wherein A and M represent a different monovalent to trivalent metal, $\square$ represents a part defective in Ti, x is a positive real number satisfying 0<x<1.0, and y and z are 0 or a positive real number satisfying 0<y+z<1.0, respectively]

(referred to as "layered titanate") with an acid or warm water to replace an A ion and/or a M ion with hydrogen and/or a hydronium ion, and (2) a step of acting a basic compound having interlayer swelling activity thereon, to swell or peel between layers (referred to as "nanosheeted layered titanic acid").

In the general formula (1), A is a metal of a valent number of 1 to 3. Preferable A is potassium (K), rubidium (Rb) or cesium (Cs). M is a metal of a valent number of 1 to 3 which is different from the metal A. Preferable M is lithium (Li), magnesium (Mg), zinc (Zn), copper (Cu), iron (Fe), aluminum (Al), gallium (Ga), manganese (Mn) or nickel (Ni).

Examples of the general formula (1) include $K_{0.8}Li_{0.266}Ti_{1.733}O_4$, $Rb_{0.75}Ti_{1.75}Li_{0.25}O_4$, $Cs_{0.7}Ti_{1.77}Li_{0.23}O_4$, $Ce_{0.7}Ti_{1.825}\square_{0.175}O_4$, $Ce_{0.7}Ti_{1.65}Mg_{0.35}O_4$, $K_{0.8}Ti_{1.6}Mg_{0.4}O_4$, $K_{0.8}Ti_{1.6}Ni_{0.4}O_4$, $K_{0.8}Ti_{1.6}Zn_{0.4}O_4$, $K_{0.8}Ti_{1.6}Cu_{0.4}O_4$, $K_{0.8}Ti_{1.2}Fe_{0.8}O_4$, $K_{0.8}Ti_{1.2}Mn_{0.8}O_4$, $K_{0.76}Ti_{1.73}Li_{0.22}Mg_{0.05}O_4$, and $K_{0.67}Ti_{1.73}Al_{0.07}Li_{0.2}O_4$. Preferable layered titanate is $K_{0.8}Li_{0.266}Ti_{1.733}O_4$ or $K_{0.8}Ti_{1.6}Mg_{0.4}O_4$.

A shape of the nanosheeted layered titanic acid used in the present invention is plate-like or thin piece-like (scale-like), and an average thickness is usually 10 nm to 20 µm, preferably 20 nm to 10 µm, and an average length diameter is usually 0.1 to 50 µm, preferably 1 to 40 µm.

Preferable nanosheeted layered titanic acid is a nanosheeted layered titanic acid represented by the general formula:

$$B_mC_n\square_{(y+z)}Ti_{2-(y+z)}O_4 \quad (2)$$

[wherein B represents a basic compound having interlayer swelling activity, C represents hydrogen and/or a hydronium ion, $\square$ represents a part defective in Ti, m is a positive real number satisfying 0.1<m<0.7, n is a positive real number satisfying 0.3<n<0.9, more preferably, n is a positive real number satisfying 0.5<n<0.8, a sum of m and n corresponds to x in the general formula (1), and y and z are 0 or a positive real number satisfying 0<y+z<1.0, respectively]. When n is a positive real number satisfying 0.3<n<0.9 in the above general formula (2), reduction in a molecular weight of a biodegradable resin composition after kneading can be suppressed more.

The nanosheeted layered titanic acid of the above general formula (2) can be obtained by a preparing process, which comprises:

(1) a step of treating layered titanate represented by the general formula:

$$A_xM_y\square_zTi_{2-(y+z)}O_4 \quad (1)$$

[wherein A and M represent a different monovalent to trivalent metal, $\square$ represents a part defective in Ti, x is a positive real number satisfying 0<x<1.0, and y and z are 0 or a positive real number satisfying 0<y+z<1.0, respectively]

with an acid or warm water to replace an A ion and/or a M ion with hydrogen and/or a hydronium ion, and (2) a step of acting a basic compound having interlayer swelling activity thereon, to swell or peel between layers.

The layered titanate represented by the general formula (1) can be prepared by a process disclosed, for example, in U.S. Pat. No. 3,062,497. Specifically, an oxide of a metal A, M or Ti, or a raw material compound which is converted into the oxide by heating may be, if necessary, ground and mixed, and may be heat-fired in the presence of or in admixture with a flux. Examples of the flux include halide and sulfate of an alkali metal, and halide and sulfate of an alkaline earth metal. The flux may be used so that a weight ratio of flux/raw material compound is 0.1 to 2.0. Heat-firing is performed under a temperature of 700 to 1200° C. Examples of other preparing process include a process of mixing cesium carbonate, and titanium dioxide at a mole ratio of 1:5.3, and firing the mixture at 800° C. to obtain orthorhombic cesium titanate ($Cs_xTi_{2-x/4}O_4$, x=0.70) which is a lepidocrocite-type analogous titanate compound according to the process disclosed in U.S. Pat. No. 2,979,132, and a process of mixing and grinding potassium carbonate, lithium carbonate and titanium dioxide at K/Li/Ti=3/1/6.5 (molar ratio) and firing the mixture at 800° C. to obtain $K_{0.8}Li_{0.27}Ti_{1.73}O_4$ which is a lepidocrocite-type analogous titanate compound according to the process disclosed in International Publication WO 99/11574.

As the step (1) and the step (2), there are a method of performing a step (1) and subsequently a step (2) (preparing process 1), and a method of performing a step (1) and a step (2) in one pot (preparing process 2).

As the method of performing a step (1) and subsequently a step (2), first, layered titanate represented by the general formula (1) is subjected to acid treatment or warm water treatment [step (1)].

In the case of acid treatment, for example, an acid may be added to a dispersion of layered titanate represented by the general formula (1) in water, preferably, under stirring. An amount of layered titanate in a water dispersion is not particularly limited, but may be appropriately selected in view of workability. As the acid, an inorganic acid such as hydrochloric acid, sulfuric acid, nitric acid, phosphoric acid, and boric acid can be preferably used, but an organic acid may be used. An amount of the acid used can be appropriately selected from a wide range depending on a replacement rate of an A ion and/or a M ion in the general formula (1) of layered titanate with hydrogen and/or a hydronium ion. Usually, around 10 to 2000 equivalent % of an ion exchange capacity of layered titanate may be used. Acid treatment may be performed by one time procedure, or may be performed repeatedly by reducing a concentration of an acid, or reducing an amount of an acid used. When repetitive acid treatment is performed, a replacement rate can be easily changed. Thereby, even a small amount of an acid can change a replacement rate when treatment is performed many times. A reaction is performed usually at 60 to 90° C. for about 30 minutes to 24 hours.

In the case of warm water treatment, for example, layered titanate may be dispersed in warm water usually at 40° C. or higher, preferably 60° C. or higher, and this may be stirred. Warm water treatment is completed usually in 1 to 10 hours, preferably 2 to 5 hours. Warm water treatment may be performed repeatedly.

By acid treatment or warm water treatment, layered titanate can be obtained in which an A ion and/or a M ion in layered titanate is replaced with hydrogen and/or a hydronium ion. A replacement rate of a metal represented by A and M with hydrogen and/or a hydronium ion in the resulting layered titanate can be measured according to the known method. For example, Li can be quantitated by flame analysis after a sample is dissolved in ammonium sulfate-containing sulfuric acid. At the same time, K, Ti, Mg, Rb, Cs, Zn, Al, Fe, Mn, Cu, Ni, Ga and the like can be quantitated by a fluorescent X-ray analysis method. Therefore, a replacement rate can be calculated by quantitating an amount of a metal before and after acid treatment or warm water treatment.

Then, a basic compound having interlayer swelling activity is acted on the above-obtained layered titanic acid to swell or peel between layers [step 2].

Examples of the basic compound having interlayer swelling activity include primary to tertiary amine and a salt thereof, a quaternary ammonium salt, a phosphonium salt, an amino acid and a salt thereof. Examples of the primary amine include methylamine, ethylamine, n-propylamine, butylamine, pentylamine, hexylamine, octylamine, dodecylamine, and stearylamine. Examples of the secondary amine include diethylamine, dipentylamine, dioctylamine, and dibenzylamine. Examples of the tertiary amine include triethylamine, and trioctylamine. Examples include alkylamine such as 2-ethylhexylamine or a salt thereof, alkanolamine such as ethanolamine, diethanolamine, triethanolamine, isopropanolamine, diisopropanolamine, triisopropanolamine, N,N-dimethylethanolamine, and 2-amino-2-methyl-1-propanol, or a salt thereof, a hydroxylated quaternary ammonium salt such as tetramethylammonium hydroxide, tetraethylammonium hydroxide, tetrapropylammonium hydroxide, and tetrabutylammonium hydroxide, a quaternary ammonium salt such as dodecyltrimethylammonium salt, cetyl trimethylammonium salt, stearyltrimethylammonium salt, benzyltrimethylammonium salt, benzyltributylammonium salt, trimethylphenylammonium salt, dimethyldistearylammonium salt, dimethyldidecylammonium salt, dimethylstearylbenzylammonium salt, dodecylbis(2-hydroxyethyl)methylammonium salt, and trioctylmethylammonium, amino acid such as 12-aminododecanoic acid, and aminocaproic acid, or a salt thereof, 3-methoxypropylamine, 3-ethoxypropylamine, and polyethyleneimine, or a salt thereof, and polydiallyldimethylammonium chloride. Further, organic phosphonium salts such as tetrabutylphosphonium salt, hexadecyltributylphosphonium salt, dodecyltributylphosphonium salt, and dodecyltriphenylphosphonium salt can be also used. These basic compounds may be used alone or by mixing a few of them depending on the purpose.

In order to act a basic compound having interlayer swelling activity, a basic compound or a basic compound diluted with an aqueous medium may be added to a suspension in which layered titanic acid after acid treatment or warm water treatment is dispersed in an aqueous medium, under stirring. Alternatively, the layered titanic acid or its suspension may be added to an aqueous basic compound solution, under stirring.

An aqueous medium or an aqueous solution means water, a solvent which is soluble in water, or a mixed solvent of water and a solvent which is soluble in water, or a solution thereof.

Examples of the solvent which is soluble in water include alcohols such as methyl alcohol, ethyl alcohol, and isopropyl alcohol, ketones such as acetone, ethers such as tetrahydrofuran and dioxane, nitriles such as acetonitrile, and esters such as ethyl acetate, and propylene carbonate.

An amount of a basic compound to be added is 1 to 200 equivalent %, preferably 5 to 100 equivalent % of an ion exchange capacity of layered titanate represented by the formula (1) in view of that replacement with a basic compound having swelling activity is performed while hydrogen and/or a hydronium ion remains between layers. Herein, an ion exchange capacity refers to a value represented by m×+ny letting a valence number of A in the general formula (1) of layered titanate to be m, and a valence number of M to be n.

A reaction is performed usually at 60 to 90° C. for about 30 minutes to 24 hours.

From the foregoing (preparing process 1), nanosheeted layered titanic acid used in present invention can be obtained.

As a method of performing a step (1) and a step (2) in one pot, an acid and a basic compound having interlayer swelling activity are acted on layered titanate represented by the general formula (1) in one pot. One pot in the present invention means that addition of an acid and addition of a basic compound are subsequently performed without performing other step such as a washing step therebetween, or an acid and a basic compound are added at the same time. For example, an acid or an acid diluted with an aqueous medium is added to a suspension in which the layered titanate is dispersed in an aqueous medium, under stirring, and subsequently a basic compound having interlayer swelling activity or a basic compound having interlayer swelling activity diluted with an aqueous medium may be added. Alternatively, a basic compound having interlayer swelling activity or a basic compound having interlayer swelling activity diluted with an aqueous medium is added to a suspension in which layered titanate is dispersed in an aqueous medium, under stirring, and subsequently an acid or an acid diluted with an aqueous medium may be added. Alternatively, a mixture obtained by mixing a basic compound having interlayer swelling activity and an acid in advance, or the mixture diluted with an aqueous medium may be added to the aforementioned suspension. Further, by reversing an addition order, a dispersion in which layered titanate or layered titanate dispersed in an aqueous medium may be added to the aforementioned mixture of an acid and a basic compound. Herein, an aqueous medium means water, a solvent which is soluble in water, or a mixed solvent of water and a solvent which is soluble in water.

Examples of the solvent which is soluble in water include alcohols such as methyl alcohol, ethyl alcohol, and isopropyl alcohol, ketones such as acetone, and ethers such as tetrahydrofuran and dioxane, nitrites such as acetonitrile, and esters such as ethyl acetate, and propylene carbonate.

As the acid, an inorganic acid such as hydrochloric acid, sulfuric acid, nitric acid, phosphoric acid and boric acid can be preferably used, but an organic acid may be used.

An amount of an acid used can be appropriately selected from a wide range, depending on a replacement rate of an A ion and/or a M ion in the general formula (1) of layered titanate with hydrogen and/or a hydronium ion, but it is usually 5 to 250 equivalent %, preferably 10 to 200 equivalent % of an ion exchange capacity of layered titanate. When the amount is more than 200 equivalent %, an A ion and/or a M ion of the aforementioned titanate is only replaced with a hydrogen ion and/or a hydronium ion, and it becomes difficult to cause interlayer swelling. Herein, an ion exchange capacity refers to a value represented by mx+ny letting a valence number of A in the general formula (1) of layered titanate to be m, and a valence number of M to be n.

Examples of the basic compound having interlayer swelling activity include primary to tertiary amines and a salt thereof, a quaternary ammonium salt, a phosphonium salt, an amino acid and a salt thereof. Examples of the primary amine include methylamine, ethylamine, n-propylamine, butylamine, pentylamine, hexylamine, octylamine, dodecylamine, and stearylamine. Examples of the secondary amine include diethylamine, dipentylamine, dioctylamine, and dibenzylamine. Examples of the tertiary amine include triethylamine, and trioctylamine. Examples include alkylamine such as 2-ethylhexylamine or a salt thereof, alkanolamine such as ethanolamine, diethanolamine, triethanolamine, isopropanolamine, diisopropanolamine, triisopropanolamine, N,N-dimethylethanolamine, and 2-amino-2-methyl-1-propanol, or a salt thereof, hydroxylated quaternary ammonium salt such as tetramethylammonium hydroxide, tetraethylammonium hydroxide, tetrapropylammonium hydroxide, and tetrabutylammonium hydroxide, quaternary ammonium salt such as dodecyltrimethylammonium salt, cetyltrimethylammonium salt, stearyltrimethylammonium salt, benzyltrimethylammonium salt, benzyltributylammonium salt, trimethylphenylammonium salt, dimethyldistearylammonium salt, dimethyldidecylammonium salt, dimethylstearylbenzylammonium salt, dodecylbis(2-hydroxyethyl)methylammonium salt, and trioctylmethylammonium salt, amino acid such as 12-aminododecanoic acid, and aminocaproic acid, or a salt thereof, 3-methoxypropylamine, 3-ethoxypropylamine, and polyethyleneimine, or a salt thereof, and polydiallyldimethylammonium chloride. Further, organic phosphonium salts such as tetrabutylphosphonium salt, hexadecyltributylphosphonium salt, dodecyltributylphosphonium salt, and dodecyltriphenylphosphonium salt can be also used. These basic compounds may be used alone or by mixing a few of them, depending on the purpose.

An amount of a basic compound having interlayer swelling activity to be used is 5 to 100 equivalent %, preferably 10 to 100 equivalent % of an ion exchange capacity of layered titanate. When the amount is smaller than 5 equivalent %, swelling hardly proceeds and, when the amount exceeds 100 equivalent %, effect on swelling is small, and this is economically disadvantageous, and there is a possibility that filtration is prevented.

When a basic compound having interlayer swelling activity and an acid are reacted on layered titanate in one pot, although overheating is not particularly requisite, the materials may be overheated in order to promote a reaction, or dissolve a basic compound having interlayer swelling activity.

A reaction is performed usually at 60 to 90° C. for about 30 minutes to 24 hours.

From the foregoing (preparing process 2), nanosheeted layered titanic acid used in the present invention can be obtained.

A preferable preparing process is a process of acting an acid and a basic compound having interlayer swelling activity in one pot, represented by the preparing process 2. Since a reaction can be performed in one pot, a production time can be shortened, and nanosheeted layered titanic acid can be prepared economically. In addition, nanosheeted layered titanic acid obtained by the preparing process 2 can more suppress reduction in a molecular weight of a biodegradable resin composition after kneading as compared with nanosheeted layered titanic acid obtained in the preparing process 1, although reasons are not clear.

Depending on an amount of an acid to be used, or an amount of a basic compound having interlayer swelling activity to be used, all of an A ion and/or a M ion of layered titanate are not replaced in some cases. In that case, nanosheeted layered titanic acid swelled with a basic compound is obtained while a part of an A ion and/or a M ion remains. Layered titanic acid referred herein includes such the layered titanic acid in which an A ion and/or a M ion remains.

In the biodegradable resin composition of the present invention, an amount of nanosheeted layered titanic acid is not particularly limited, but may be appropriately selected, and is usually 0.5 to 100 parts by weight, preferably 1 to 30 parts by weight relative to 100 parts by weight of polylactic acid. When the amount is below 0.5 part by weight, reinforcing effect can not be expected and, on the other hand, when the amount exceeds 100 parts by weight, molding becomes difficult.

The biodegradable resin composition of the present invention may be copolymerized or mixed with other biodegradable resin in such a range that properties thereof are not deteriorated, depending on necessity. Examples of other biodegradable resin include aliphatic polyester, a representative of which is polyethylene succinate, and polybutylene succinate, polyhydroxycarboxylic acid, a representative of which is polyglycholic acid, and poly 3-hydroxybutyric acid, poly ω-hydroxyalkanoate such as poly ε-caprolactam, and polyesteramide, polyester carbonate, and polysaccharide.

One kind or two or more kinds of various organic compounds or inorganic compounds which have previously been used as a resin additive may be blended in the biodegradable resin composition of the present invention in such a range that preferable properties thereof are not deteriorated. Examples thereof include various shaped (particulate, fibrous, scaly) inorganic fillers, pigments, antioxidants, flame-retardants, drip preventing agents, ultraviolet absorbing agents, light stabilizers, light shielding agents, metal inactivating agents, aging preventing agents, slidants, plasticizers, impact strength improvers, and compatibilizers.

The biodegradable resin composition of the present invention can be prepared by mixing or kneading a predetermined amount of nanosheeted layered titanic acid and, if necessary, a resin additive into polylactic acid according to the known means. For example, the biodegradable resin composition of the present invention can be obtained by mixing respective powdery, bead-like, flake-like or pellet-like components, if necessary, with a mixer or a tumbler, and mixing and kneading the materials using an extruder such as a monoaxial extruder and a biaxial extruder, or a kneading machine such as a Banbury mixer, a kneader, and a mixing roll. The thus obtained resin composition may be pelletized with a pelletizer, and processed into an arbitrary shape such as a film, a tube, a sheet, and various molded articles according to the known molding means such as injection molding and extrusion molding. Alternatively, a master batch containing nanosheeted layered titanic acid at a high concentration is prepared, and this may be used by diluting or mixing with a resin which is the same as or different from a resin of the master batch, at a stage of molding processing by injection molding or extrusion molding.

The biodegradable resin composition of the present invention can be utilized by processing into various molded articles by a method such as injection molding and extrusion molding. As a molded article, the composition can be used as an injection molded article, an extrusion molded article, a blowing molded article, a film, a fiber or a sheet. As a film, the composition can be utilized as various films such as an unstretched film, a monoaxially stretched film and a biaxially stretched film. As a fiber, the composition can be utilized as various fibers such as an unstretched yarn and a stretched yarn. Alternatively, these may be utilized in various utilities such as electric-electronic parts, construction parts, automobile parts, and daily necessaries.

The biodegradable resin composition of the present invention can be formulated into a foam. When the biodegradable resin composition of the present invention is expanded, the known expanding method using a degradation-type expanding agent can be adopted. As the degradation-type expanding agent, either of the known organic degradation-type expanding agent and inorganic degradation-type expanding agent can be used. Examples of the organic degradation-type expanding agent include azo-based compounds such as azodicarbonamide, azoisobutyronitrile, diazoaminobenzene, barium azodicarboxylate, and hydrazodiazocarbonamide, sulfonylhydrazide compounds such as p-toluenesulfonylhydrazide, and 4,4'-oxybis(benzenesulfonylhydrazide), nitroso compounds such as N,N'-dinitrosopentamethylenetetramine, and N,N'-dinitroso-N,N'-dimethylterephthalamide, and heterocyclic compounds such as 5-phenyltetrazole, and 4-aminourazole. Examples of the inorganic degradation-type expanding agent include calcium carbonate, sodium dicarbonate, sodium carbonate, calcium oxide, sodium oxide, and magnesium oxide. The degradation-type expanding agents may be used alone, or two or more of them may be used jointly. An amount of the degradation-type expanding agent to be blended is not particularly limited, but can be appropriately selected from a wide range, depending on various conditions such as a kind of a resin, an amount of layered titanic acid to be blended, a kind of the degradation-type expanding agent itself, expanding condition, and utility of the resulting foam, and is usually 1 to 30 parts by weight, preferably 2 to 15 parts by weight relative to 100 parts by weight of the resin composition of the present invention.

The organic degradation-type expanding agent may be subjected to surface treatment. As a surface treating agent, the known surface treating agents can be used, and examples thereof include fats or oils such as a coupling agent such as a silane series coupling agent (methyltrimethoxysilane, γ-aminopropyltriethoxysilane, N-(β-aminoethyl)-γ-aminopropyltrimethoxysilane, N-phenylaminomethyltrimethoxysilane, vinylmethyldiethoxysilane etc.), an aluminum series coupling agent (aluminum isopropylate, aluminum ethylate, aluminum (ethylacetoacetylate), ethylacetoacetate aluminum diisopropylate etc.), a titanate series coupling agent (isopropyltriisostearoyl titanate, isopropyltris(dioctylpyrophosphate) titanate, tetraoctylbis(ditridecylphosphite) titanate, bis(dioctylpyrophophate)oxyacetate titanate etc.), a liquid to solid fat or oil (vegetable or animal natural fats or oils such as soybean oil, palm oil, linseed oil, cottonseed oil, rapeseed oil, tung oil, pine oil, rosin, castor oil, beef tallow, squalane, lanolin, hardened oil etc. and purified products thereof), hydrocarbons (aliphatic hydrocarbon of a carbon number of 20 to 48 and a derivative thereof, aromatic hydrocarbons of a carbon number of 8 to 19 and a derivative thereof (e.g. dialkyl phthalates such as dioctyl phthalate, higher alcohol phthalates such as nonyl alcohol phthalate etc.), fatty acids such as paraffinic, naphthenic or aromatic processing oil, palmitic acid, stearic acid, oleic acid, behemic acid etc., and salts thereof, or derivatives thereof).

A degradation promoter can be blended in such a range that physical properties of the resulting foam are not deteriorated. As the degradation promoter, the known promoters can be used, and examples thereof include metal oxides such as zinc oxide and lead oxide, metal carbonates such as zinc carbonate, lead carbonate, and potassium carbonate, metal chlorides such as zinc chloride, and potassium chloride, metal acetates such as zinc acetate, zinc oleylate, zinc stearylate, sodium benzene sulfinate, zinc 2-ethylhexoinate, and urea. The degradation promoters may be used alone, or two or more of them may be used jointly. When the degradation promoter is blended, an amount to be blended is not particularly limited, but is usually 5 to 100 parts by weight, preferably 10 to 50 parts by weight relative to 100 parts by weight of the degradation-type expanding agent.

An expansion nucleating agent may be blended in such a range that physical properties of the resulting foam are not deteriorated. As the expansion nucleating agent, the known nucleating agents can be used, and examples thereof include talc, silica, calcium carbonate, clay, zeolite, kaolin, bentonite, aluminum oxide, and magnesium carbonate. Nucleating agents may be used alone, or two or more of them may be used jointly. An amount of the expansion nucleating agents to be blended is not particularly limited, but may be appropriately selected from a wide range, depending on various conditions such as a kind of a resin, a kind and a blending amount of nanosheeted layered titanic acid, a kind of the expansion nucleating agent itself, a kind and a blending amount of a degradation expanding agent, expanding condition, and physical properties and utilities of a foam to be obtained, and is usually 0.1 to 50 parts by weight, preferably 0.5 to 1 part by weight relative to 100 parts by weight of the resin composition of the present invention.

More specifically, examples of the known expanding method using a degradation-type expanding agent include (1) a method of obtaining a foam by kneading a resin, nanosheeted layered titanic acid and a degradation—type expanding agent at such a temperature that the degradation-type expanding agent is not degraded, molding the resulting kneaded material into a prescribed shape by extrusion molding, calendar roll molding, or press molding, and heating the degradation-type expanding agent to degrade it to evolve a gas, (2) a method of obtaining a foam by kneading a resin, nanosheeted layered titanc acid and a degradation—type expanding agent at such a temperature that the degradation-type expanding agent is not degraded, coating or printing the resulting kneaded material on a substrate such as a pulp paper, an aluminum hydroxide paper, a cloth, a plasterboard, a cellulose board, and a pearlite plate with a coating device such as a knife coater, a roll coater, and sprayer, or a printing device such as silk screen printing, and rotary screen printing so that a film thickness after drying becomes 0.05 to 0.50 mm, drying this at such a temperature that a degradation-type expanding agent is not degraded (usually 80 to 150° C.) for 30 seconds to 5 minutes using a drying furnace such as an electric heating hot air furnace, a LPG burning hot air furnace, and an oil burning hot air furnace, and raising a temperature to a degradation temperature of a degradation-type expanding agent to degrade a degradation-type expanding agent, and (3) a method of obtaining a foam having a prescribed shape by mixing a resin, nanosheeted layered titanic acid and a degradation-type expanding agent, and performing extrusion molding, injection molding or press molding at such a temperature that melting of a resin and degradation of a degradation-type expanding agent occur. In either method, expansion (=degradation of degradation-type expanding agent) is performed usually at a temperature of 180 to 230° C., and is completed usually in about 30 seconds to 3 minutes.

The thus obtained foam can be utilized in the same utilities as those for a molded article of the biodegradable resin composition of the present invention.

The following Examples and Comparative Examples further illustrate the present invention specifically, but the present invention is not limited by the following Examples at all. Hereinafter, "%" and "part" mean a weight basis unless otherwise indicated.

EXAMPLE 1

(Synthesis of layered titanate) 27.64 g of potassium carbonate, 4.91 g of lithium carbonate, 69.23 g of titanium dioxide and 74.56 g of potassium chloride were ground and mixed in a dry manner to obtain a raw material, which was fired at 105° C. for 4 hours. A sample after firing was immersed in 10 kg of pure water, stirred for 20 hours, separated, washed with water, and dried at 110° C. The resulting white powder is layered titanate $K_{0.80}Li_{0.266}Ti_{1.733}O_4$, and an average long diameter was 28 µm, and an average thickness was 2.5 µm.

(Synthesis of organized layered titanic acid) 65 g of this layered titanate was dispersed in 4 kg of deionized water, and 63 g of dodecylmetylbis(hydroxyethyl)ammonium chloride was added to dissolve it. Further, 28 g of 35% hydrochloric acid was added, to react the materials at 80° C. for 1 hour, followed by separation by suction filtration. After sufficiently washed with hot water, the material was dried at 40° C. in the air. Further, the material was dried at 160° C. for 12 hours under reduced pressure to obtain organized layered titanic acid in which a space between layers is swollen while a hydrogen ion or a hydronium ion remains at 67 equivalent % relative to a potassium/and lithium ion part of titanate. An average long diameter of the resulting organized layered titanic acid was 24 µm, and an average thickness was 4.1 µm.

(Preparation and assessment of biodegradable resin composition) The aforementioned organized layered titanic acid was added to polylactic acid (Tm=169° C., Tg=60° C.) to an ash of 5%, which was kneaded with a Laboplast mill (manufactured by Toyo Seiki Co., Ltd.). Kneading condition was 200° C., 60 rpm and 5 minutes. The removed resin composition was ground, and molded into a test piece according to JIS, at a cylinder temperature of 200° C. and a mold temperature of 25° C. with an injection molding machine (trade name: Minimat M26 manufactured by Sumitomo Heavy Industries, Ltd.). Using this test piece, a bending elastic modulus (JIS K7203) was obtained, and GPC (manufactured by Waters) was used in measurement of a molecular weight. For assessing a melt viscosity, a flow rate obtained by a low load extrusion-type thin tube—type rheometer (trade name Shimadzu Flow Tester CFT-500D/100D manufactured by Shimadzu Corporation) was compared. Further, for measuring a thermal expansion coefficient, TMA/SS 6000 (manufactured by Seiko Instruments Inc.) was used, and a value at 150° C. to 160° C. was respectively compared as a thermal expansion rate near a melting point. For assessing durability, a test piece was positively hydrolyzed for 3 days under conditions of 60° C. and humidity 90%, and a bending elastic modulus (JIS K7203) of a test piece was compared. The results are shown in Table 1.

EXAMPLE 2

(Synthesis of layered titanate) Under the same conditions as those of Example 1, layered titanate $K_{0.8}Li_{0.266}Ti_{1.733}O_4$ was synthesized.

(Synthesis of organized layered titanic acid) 130 g of this layered titanate was dispersed in 8 kg of deionized water, and 134 g of stearyltrimethylammonium chloride was added to dissolve it. Further, 56 g of 35% hydrochloric acid was added to react the materials at 80° C. for 1 hour, followed by separation by suction filtration. After sufficiently washed with a mixed solution of water and methanol, the material was dried at 40° C. in the air. Further, the material was dried at 160° C. for 12 hours under reduced pressure to obtain organized layered titanic acid in which a space between layers is swollen while a hydrogen ion or a hydronium ion remains at 65 equivalent % relative to a potassium/and lithium ion part of titanate. An average long diameter of the resulting organized layered titanic acid was 25 µm, and an average thickness was 4.5 µm.

(Preparation and assessment of biodegradable resin composition) According to the same manner as that of Example 1, a resin test piece was prepared, and each test was performed. The results are shown in Table 1.

EXAMPLE 3

(Synthesis of layered titanate) Under the same conditions as those of Example 1, layered titanate $K_{0.80}Li_{0.266}Ti_{1.733}O_4$ was synthesized.

(Synthesis of organized layered titanic acid) 26 g of this layered titanate was dispersed in 1600 g of deionized water, 45.2 g of dimethyldistearylammonium chloride was added to dissolve it. Further, 5.6 g of 35% hydrochloric acid was added to react the materials at 80° C. for 1 hour, followed by separation by suction filtration. After sufficiently washed with a mixed solution of water and methanol, the material was dried at 40° C. in the air. Further, the material was dried at 160° C. for 12 hours under reduced pressure to obtain organized layered titanic acid in which a space between layers is swollen while a hydrogen ion or a hydronium ion remains at 77 equivalent % relative to a potassium/and lithium ion part of titanate. An average long diameter of the resulting organized layered titanic acid was 24 µm, and an average thickness was 4.6 µm.

(Preparation and assessment of biodegradable resin composition) According to the same manner as that of Example 1, a resin test piece was prepared, and each test was performed. The results are shown in Table 1.

EXAMPLE 4

(Synthesis of layered titanate) Under the same conditions as those of Example 1, layered titanate $K_{0.80}Li_{0.266}Ti_{1.733}O_4$ was synthesized.

(Synthesis of organized layered titanic acid) 8.0 g of 35% hydrochloric acid was diluted with 800 g of deionized water, and 21 g of octadecylamine was added to dissolve it. Further, 13 g of the layered titanate was added to react the materials at 80° C. for 1 hour, followed by separation by suction filtration. After sufficiently washed with a mixed solution of water and methanol, the material was dried at 40° C. in the air. Further, the material was dried at 160° C. for 12 hours under reduced pressure to obtain the organized layered titanic acid in which a space between layers is swollen while a hydrogen ion or a hydronium ion remains at 57 equivalent % relative to a potassium/and lithium ion part of titanate. An average long diameter of the resulting organized layered titanic acid was 23 μm, and an average thickness was 4.8 μm.

(Preparation and assessment of biodegradable resin composition) According to the same manner as that of Example 1, a resin test piece was prepared, and each test was performed. The results are shown in Table 1.

EXAMPLE 5

(Synthesis of layered titanate) Under the same conditions as those of Example 1, layered titanate $K_{0.80}Li_{0.266}Ti_{1.733}O_4$ was synthesized.

(Synthesis of organized layered titanic acid) 80 g of 35% hydrochloric acid was diluted with 8 kg of deionized water, and 83 g of 12-aminododecanoic acid was added to dissolve it. Further, 130 g of the layered titanate was added to react the materials at 80° C. for 1 hour, followed by separation by suction filtration. After washed with dilute hydrochloric acid, the material was dried at 40° C. in the air. Further, the material was dried at 160° C. for 12 hours under reduced pressure to obtain the organized layered titanic acid in which a space between layers is swollen while a hydrogen ion or a hydronium ion remains at 73 equivalent % relative to a potassium/and lithium ion part of titanate. An average long diameter of the resulting organized layered titanic acid was 25 μm, and an average thickness was 4.6 μm.

(Preparation and assessment of biodegradable resin composition) According to the same manner as that of Example 1, a resin test piece was prepared, and each test was performed. The results are shown in Table 1.

EXAMPLE 6

(Synthesis of layered titanate) Under the same conditions as those of Example 1, layered titanate $K_{0.80}Li_{0.266}Ti_{1.733}O_4$ was synthesized.

(Synthesis of layered titanic acid) 65 g of this $K_{0.80}Li_{0.266}Ti_{1.733}O_4$ was dispersed in 1 kg of deionized water, and 28 g of 35% hydrochloric acid was added. The material was stirred for 1.5 hours, separated, and washed with water to obtain layered titanic acid in which a K ion and a Li ion are exchanged with a hydrogen ion or a hydronium ion. An exchange rate of a K ion was 72 equivalent %, and an exchange rate of a Li ion was 99 equivalent % or more. A $K_2O$ remaining amount after drying of this resulting layered titanic acid was 6.2%.

(Synthesis of organized layered titanic acid) 50 g of the aforementioned undried layered titanic acid was dispersed in 4 kg of deionized water, and 63 g of dodecylmethylbis (hydroxyethyl)ammonium chloride was added while heating to 80° C. and stirring. After heating and stirring was continued for 1 hour, the material was taken out by filtration. After sufficiently washed with hot water at 80° C., the material was dried at 40° C. in the air. Further, the material was dried at 160° C. for 12 hours under reduced pressure to obtain organized layered titanic acid in which a space between layers is swollen while a hydrogen ion or a hydronium ion remains at 72 equivalent % relative to a potassium/ and lithium ion part of titanate. An average long diameter of the resulting organized layered titanic acid was 22 μm, and an average thickness was 4.2 μm.

(Preparation and assessment of biodegradable resin composition) According to the same manner as that of Example 1, a resin test piece was prepared, and each test was performed. The results are shown in Table 1.

COMPARATIVE EXAMPLE 1

(Synthesis of layered titanate) Under the same conditions as those of Example 1, layered titanate $K_{0.80}Li_{0.266}Ti_{1.733}O_4$ was synthesized.

(Synthesis of layered titanic acid) 65 g of this $K_{0.80}Li_{0.266}Ti_{1.733}O_4$ was dispersed in 5 kg of 1.75% hydrochloric acid, stirred, separated, and washed with water three times to obtain layered titanic acid in which a K ion and a Li ion are exchanged with a hydrogen ion or a hydronium ion. Thus, layered titanic acid in which an exchange rate of a K ion was 97 equivalent %, and an exchange rate of a Li ion was 99 equivalent % or more was obtained. A $K_2O$ remaining amount after drying of this layered titanic acid was 0.6%.

(Synthesis of Organized Layered Titanic Acid)

18 g of the aforementioned undried layered titanic acid was dispersed in 600 g of water, and 285 g of a 0.6% aqueous 3-methoxypropylamine solution was added while stirring. Stirring for about 1 hour afforded organized layered titanic acid.

(Synthesis of Organized Layered Titanic Acid)

Subsequently, 200 g of a 8% dodecylmethylbis(hydroxyethyl)ammonium chloride solution in water/isopropanol was added while stirring. After stirring was continued for 1 hour, the material was taken out by filtration. After washed with 800 g of hot water three times, the material was dried at 40° C. in the air. Further, the material was dried at 160° C. for 12 hours under reduced pressure to obtain organized layered titanic acid. An average long diameter of the resulting organized layered titanic acid was 20 μm, and an average thickness was 4.6 μm.

(Preparation and assessment of biodegradable resin composition) According to the same manner as that of Example 1, a resin test piece was prepared, and each test was performed. The results are shown in Table 1.

COMPARATIVE EXAMPLE 2

A resin test piece composed only of polylactic acid (Tm=169° C., Tg=60° C.) was prepared, and each test was performed. The results are shown in Table 1.

COMPARATIVE EXAMPLE 3

Using Somasif MEE (manufactured by CO-OP Chemical) as a commercially available layered silicate-based filler, a comparative resin composition was prepared. This was added to polylactic acid to an ash of 5%, and a resin test piece was prepared according to the same manner as that of Example 1, and each test was performed. The results are shown in Table 1.

TABLE 1

|  | Bending Elastic Modulus (GPa) | Weight Average Molecular Weight | Flow Rate (cm³/s) | Thermal Expansion Coefficient 150–160° C. (1/° C.) | Durability |
|---|---|---|---|---|---|
| Ex. 1 | 5.7 | 186542 | 0.015 | 0.00011 | 5.3 |
| Ex. 2 | 5.3 | 188353 | 0.018 | 0.00013 | 5.0 |
| Ex. 3 | 4.9 | 176248 | 0.021 | 0.00016 | 4.5 |
| Ex. 4 | 5.0 | 172457 | 0.024 | 0.00015 | 4.6 |
| Ex. 5 | 4.7 | 190122 | 0.013 | 0.00014 | 4.5 |
| Ex. 6 | 4.9 | 177999 | 0.020 | 0.00014 | 4.6 |
| Comp. Ex. 1 | 4.0 | 155342 | 0.077 | 0.00017 | 3.9 |
| Comp. Ex. 2 | 3.4 | 195798 | 0.011 | 0.00022 | 3.1 |
| Comp. Ex. 3 | 5.6 | 140253 | 0.088 | 0.00021 | 3.3 |

As shown in Table 1, the resin compositions of Examples 1 to 6 in accordance with the present invention have remarkably improved bending elastic modulus and excellent mechanical strength as compared with only polylactic acid of Comparative Example 2. In addition, reduction in a weight average molecular weight is small and, as also seen from a flow rate, reduction in a melt viscosity is suppressed. Thereby, reduction in physical properties due to a thermal expansion coefficient and hydrolysis near a melting point can be suppressed, and a resin composition having not only high strength but also dimensional stability and durability was obtained. Further, among them, in Examples 1 to 5, by acting a particular amount of an acid and a basic compound having interlayer swelling activity on the layered titanate in one pot to swell therebetween upon synthesis of organized layered titanic acid, a resin composition having the highest function was obtained. Since Comparative Examples 1 and 3 cause a rise in a flow rate due to reduction in a weight average molecular weight of polylactic acid although a high strength can be obtained, dimensional stability and durability were inferior.

What is claimed is:

1. A biodegradable resin composition comprising polylactic acid and nanosheeted layered titanic acid, wherein the nanosheeted layered titanic acid is nanosheeted layered titanic acid represented by the formula:

$$B_mC_n\square_{(y+z)}Ti_{2-(y+z)}O_4 \quad (2),$$

wherein B represents a basic compound having interlayer swelling activity, C represents hydrogen and/or a hydronium ion, $\square$ represents a part defective in Ti, m is a positive real number satisfying in $0.1<m<0.7$, n is a positive real number satisfying $0.3<n<0.9$, a sum of m and n corresponds to x in the general formula (1), and y and z are 0 or a positive real number satisfying $0<y+z<1.0$, respectively.

2. A biodegradable resin composition comprising 100 parts by weight of polylactic acid and 0.5 to 100 parts by weight of nanosheeted layered titanic acid, wherein the nanosheeted layered titanic acid is nanosheeted layered titanic acid represented by the formula:

$$B_mC_n\square_{(y+z)}Ti_{2-(y+z)}O_4 \quad (2),$$

wherein B represents a basic compound having interlayer swelling activity, C represents hydrogen and/or a hydronium ion, $\square$ represents a part defective in Ti, m is a positive real number satisfying $0.1<m<0.7$, n is a positive real number satisfying $0.3<n<0.9$, a sum of m and n corresponds to x in the general formula (1), and y and z are 0 or a positive real number satisfying $0<y+z<1.0$, respectively.

3. The biodegradable resin composition according to claim 1, wherein the nanosheeted layered titanic acid is nanosheeted layered titanic acid obtained by a preparing process comprising the steps of:

(1) treating layered titanate represented by the general formula:

$$A_xM_y\square_zTi_{2-(y+z)}O_4 \quad (1)$$

[wherein A and M represent a different monovalent to trivalent metal, $\square$ represents a part defective in Ti, x is a positive real number satisfying $0<x<1.0$, and y and z are 0 or a positive real number satisfying $0<y+z<1.0$, respectively]

with an acid or warm water to replace an A ion and/or a M ion with hydrogen and/or a hydronium ion, and (2) reacting the resulting compound with a basic compound having interlayer swelling activity thereon, to swell or peel between layers.

4. The biodegradable resin composition according to claim 1, wherein the nanosheeted layered titanic acid is nanosheeted layered titanic acid obtained by a preparing process of performing, in one pot, the steps of:

(1) treating layered titanate represented by the general formula:

$$A_xM_y\square_zTi_{2-(y+z)}O_4 \quad (1)$$

[wherein A and M represent a different monovalent to trivalent metal, $\square$ represents a part defective in Ti, x is a positive real number satisfying $0<x<1.0$, and y and z are 0 or a positive real number satisfying $0<y+z<1.0$, respectively]

with and acid or warm water to replace an A ion and/or a M ion with hydrogen and/or a hydronium ion, and (2) reacting the resulting compound with a basic compound having interlayer swelling activity thereon, to swell or peel between layers.

5. The biodegradable resin composition according to claim 2, wherein the nanosheeted layered titanic acid is nanosheeted layered titanic acid obtained by a preparing process comprising the steps of:

(1) treating layered titanate represented by the general formula:

$$A_xM_y\square_zTi_{2-(y+z)}O_4 \quad (1)$$

[wherein A and M represent a different monovalent to trivalent metal, $\square$ represents a part defective in Ti, x is a positive real number satisfying $0<x<1.0$, and y and z are 0 or a positive real number satisfying $0<y+z<1.0$, respectively]

with an acid or warm water to replace an A ion and/or a M ion with hydrogen and/or a hydronium ion, and (2) reacting the resulting compound with a basic compound having interlayer swelling activity thereon, to swell or peel between layers.

6. The biodegradable resin composition according to claim 2, wherein the nanosheeted layered titanic acid is nanosheeted layered titanic acid obtained by a preparing process of performing, in one pot, the steps of:

(1) treating layered titanate represented by the general formula:

$$A_xM_y\square_zTi_{2-(y+z)}O_4 \quad (1)$$

[wherein A and M represent a different monovalent to trivalent metal, $\square$ represents a part defective in Ti, x is a positive real number satisfying 0<x<1.0, and y and z are 0 or a positive real number satisfying 0<y+z<1.0, respectively] with an acid or warm water to replace an A ion and/or a M ion with hydrogen and/or a hydronium ion, and (2) reacting the resulting compound with a basic compound having interlayer swelling activity thereon, to swell or peel between layers.

7. The biodegradable resin composition of claim 1, wherein in the formula (2), n is a positive real number satisfying 0.5<n<0.8.

8. The biodegradable resin composition of claim 2, wherein in the formula (2), n is a positive real number satisfying 0.5<n0.8.

* * * * *